United States Patent [19]

Yu et al.

[11] Patent Number: 4,482,982

[45] Date of Patent: Nov. 13, 1984

[54] COMMUNICATION MULTIPLEXER SHARING A FREE RUNNING TIMER AMONG MULTIPLE COMMUNICATION LINES

[75] Inventors: Kin C. Yu, Burlington; Gary J. Goss, Acton, both of Mass.

[73] Assignee: Honeywell Information Systems Inc., Waltham, Mass.

[21] Appl. No.: 514,542

[22] Filed: Jul. 18, 1983

Related U.S. Application Data

[63] Continuation of Ser. No. 191,626, Sep. 29, 1980.

[51] Int. Cl.³ ............................................. G06F 13/00
[52] U.S. Cl. ................................................... 364/900
[58] Field of Search ...................... 364/200, 900, 569; 179/2 TC, 6.31, 7.1 R; 235/104; 368/118; 340/825.22, 825.06

[56] References Cited

U.S. PATENT DOCUMENTS

| | | | |
|---|---|---|---|
| 3,408,629 | 10/1968 | Haselwood | 364/900 |
| 3,633,181 | 1/1972 | Sikorsky | 364/300 |
| 4,090,239 | 5/1978 | Twibell et al. | 364/200 |
| 4,133,030 | 1/1979 | Huettner et al. | 364/200 |
| 4,220,990 | 9/1980 | Alles | 364/200 |

Primary Examiner—Raulfe B. Zache
Assistant Examiner—David Y. Eng
Attorney, Agent, or Firm—George Grayson; Nicholas Prasinos

[57] ABSTRACT

A data processing system includes a central processing unit, a main memory, and a communication subsystem servicing a number of communication lines. The communication subsystem includes a free running timer, a line microprocessor for communicating with the communication lines and a shared memory, and an I/O microprocessor for communicating with the shared memory and the central processing unit and main memory. The line microprocessor, desiring to communicate with a specified communication line after a predetermined time delay, loads a first mailbox in shared memory with a binary number indicative of the predetermined time delay. The I/O microprocessor adds the output of the free running timer to the binary number, stores the result in a location in a random access memory, and periodically compares the result against the free running timer output. The I/O microprocessor loads a second mailbox with a control character when the results of the comparison indicate that the predetermined time delay is accomplished. The line microprocessor responds to the information in the second mailbox to communicate with the specified communication line.

8 Claims, 7 Drawing Figures

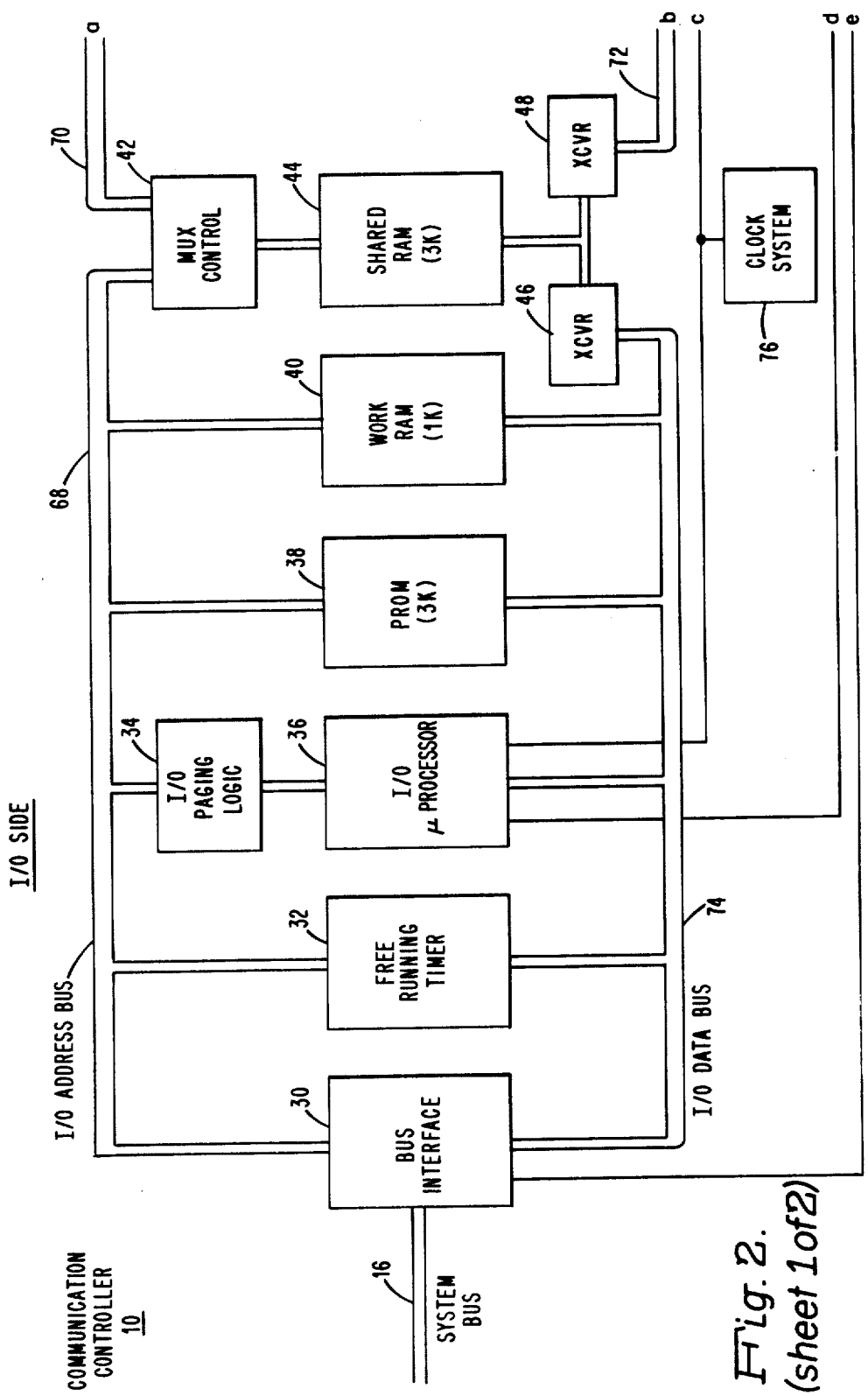
Fig. 2. (sheet 1 of 2)

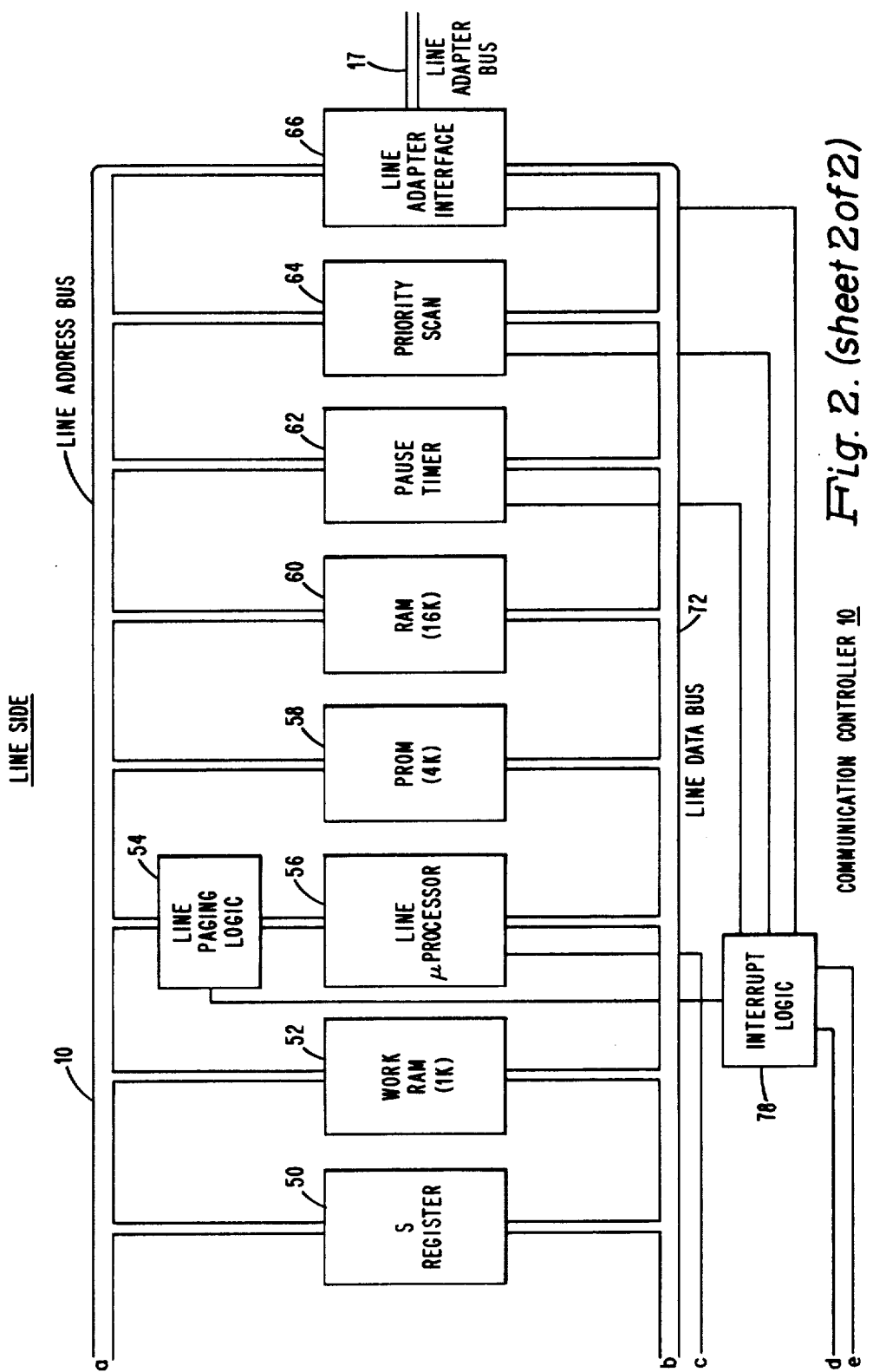
Fig. 2. (sheet 2 of 2)

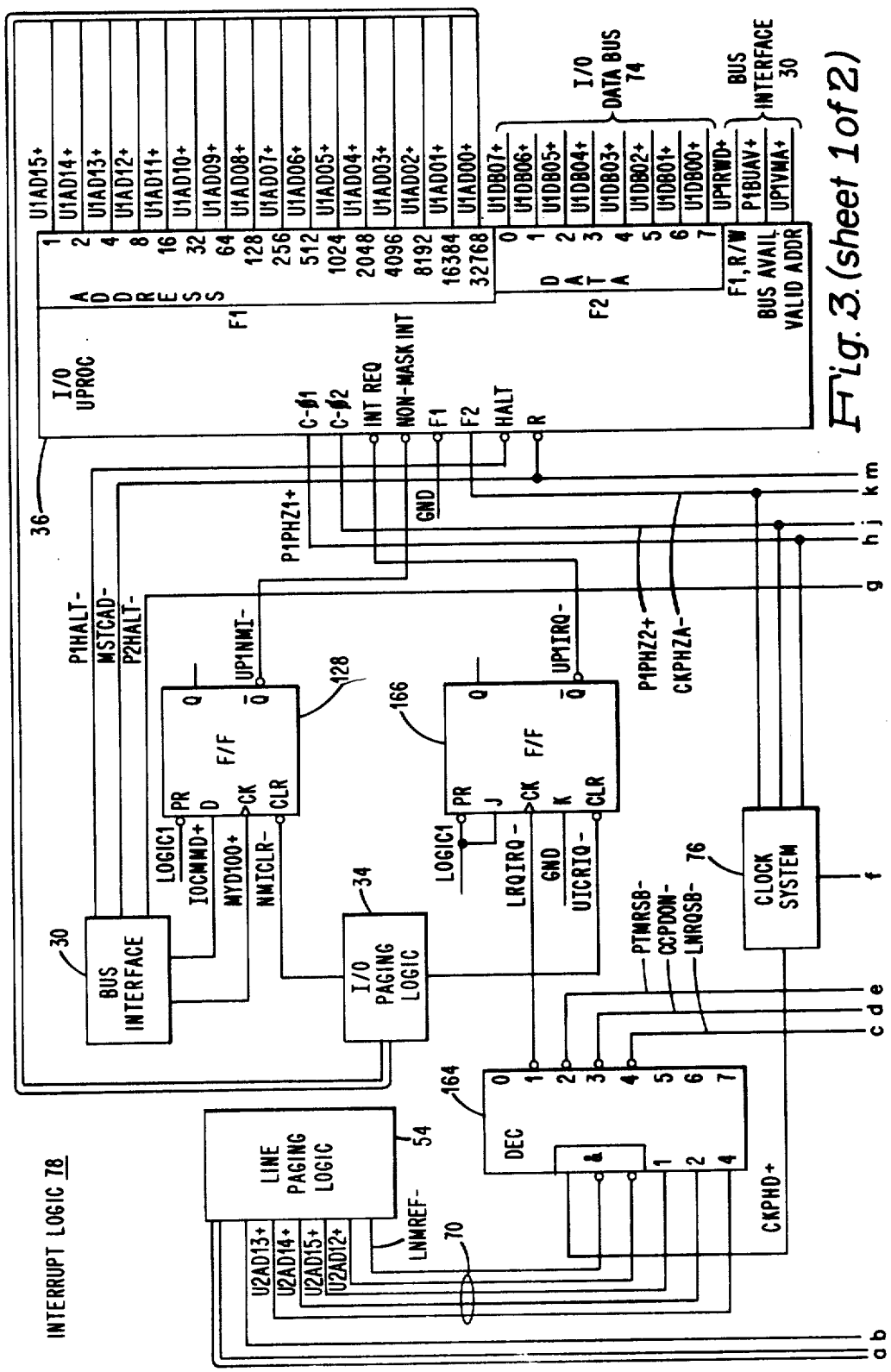
Fig. 3. (sheet 1 of 2)

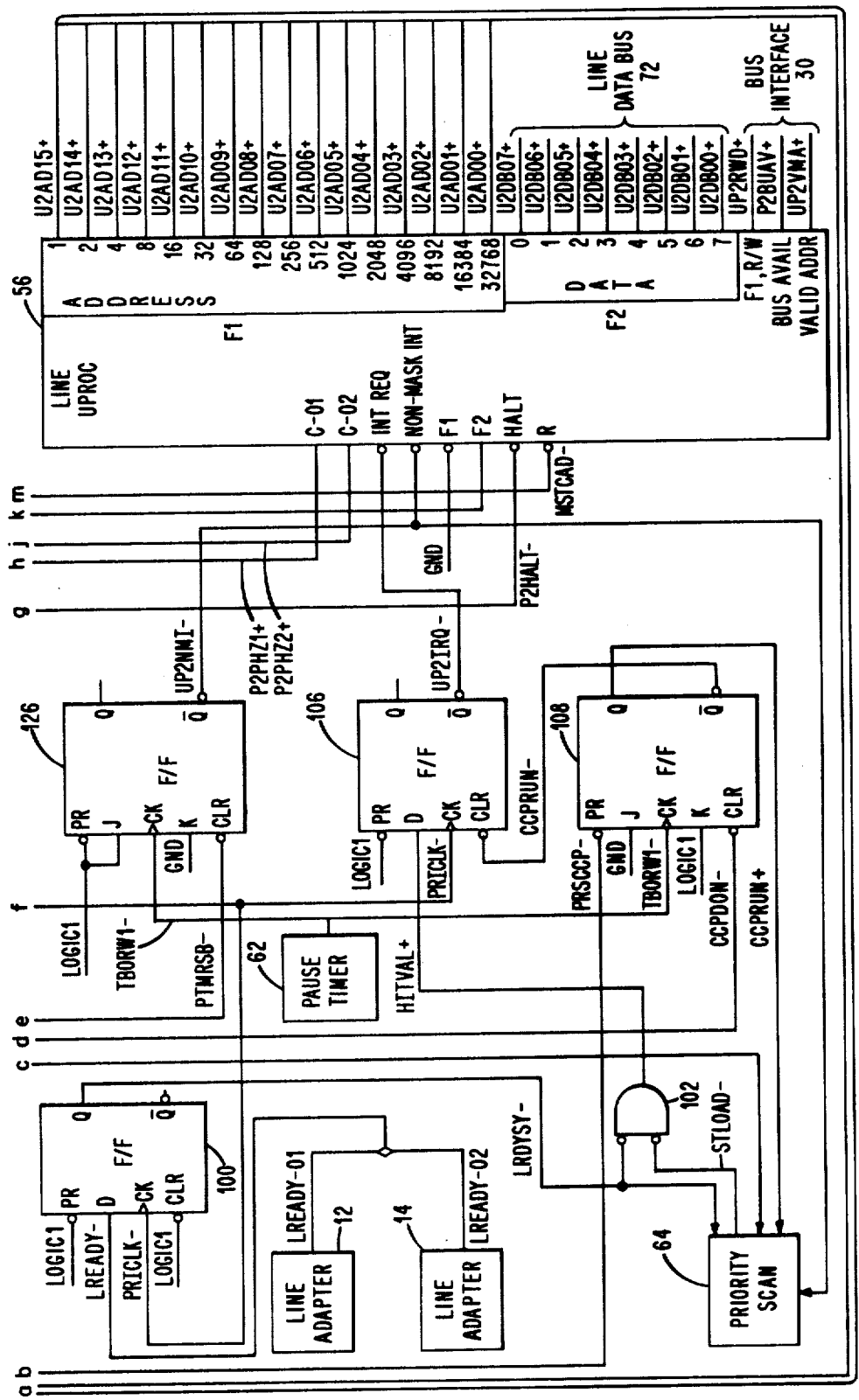
Fig. 3. (sheet 2 of 2)

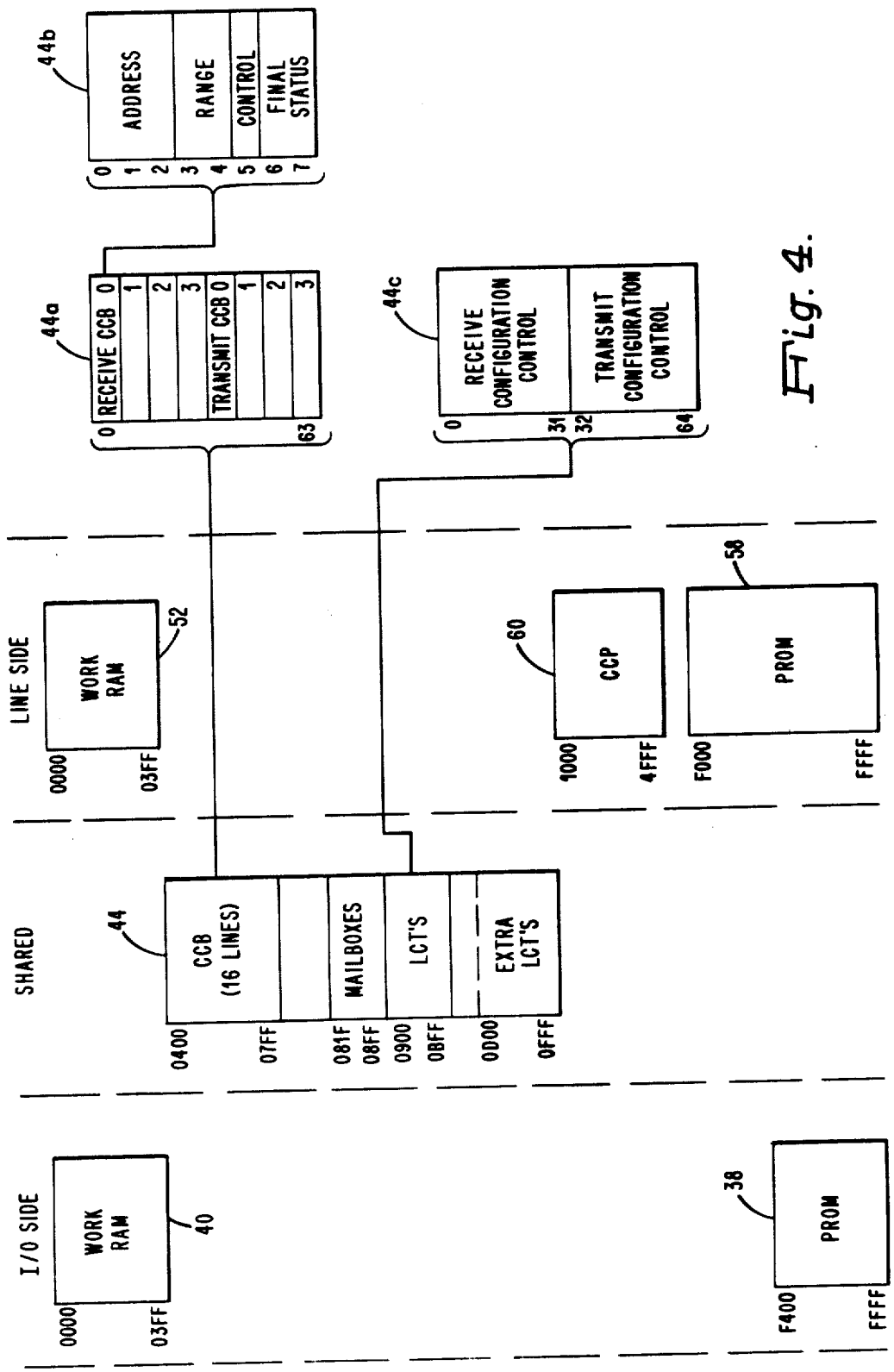

INTERPROCESSOR COMMUNICATION MAILBOXES
(ADDRESS LOCATIONS IN SHARED MEMORY 44)

MAILBOX 1 BLOCK MODE COMMANDS

```
              BIT POSITION
WORD    0   1   2   3   4   5   6   7
  0  | F | R | - | L | L | L | L | D |
  1  | SHARED MEMORY 44, WORK RAM 52, RAM 60 (MSB) |
  2  | SHARED MEMORY 44, WORK RAM 52, RAM 60 (LSB) |
```

F=1 COMMAND PRESENT - SET BY I/O MICROPROCESSOR 36
F=0 COMMAND COMPLETED - SET BY LINE MICROPROCESSOR 56
R=1 MAIN MEMORY 4 BLOCK READ
R=0 MAIN MEMORY 4 BLOCK WRITE
LLLL LINE NUMBER (1 OF 16)
D=0 RECEIVE
D=1 TRANSMIT

MAILBOX 2 I/O MICROPROCESSOR 36 COMMANDS TO LINE MICROPROCESSOR 56

```
              BIT POSITION
WORD    0   1   2   3   4   5   6   7
  0  |       ACTION CODE             |
  1  | F | - | - | L | L | L | L | D |
  2  |       REASON CODE             |
```

F=1 COMMAND PRESENT - SET BY I/O MICROPROCESSOR 36
F=0 COMMAND COMPLETED - SET BY LINE MICROPROCESSOR 56
ACTION CODE - $00_{16}$ STOP IO
              $02_{16}$ CHANNEL INITIALIZE
              $04_{16}$ START I/O FROM CPU 2
              $06_{16}$ START I/O FROM ALL OTHERS
REASON CODE - BIT 0 CHANNEL REQUEST INTERRUPT
              1 DATA SET SCAN
              2 TIMER
              7 TRANSMIT/RECEIVE (LOGICAL ONE = TRANSMIT CHANNEL/LOGICAL ZERO - RECEIVE CHANNEL)

MAILBOX 3 LINE MICROPROCESSOR 56 COMMANDS TO I/O MICROPROCESSOR 36

| WORD | \multicolumn{8}{c}{BIT POSITION} | | | | | | | |
|---|---|---|---|---|---|---|---|---|
| | 0 | 1 | 2 | 3 | 4 | 5 | 6 | 7 |
| 0 | \multicolumn{8}{c}{COMMANDS} | | | | | | | |
| 1 | F | – | – | L | L | L | L | D |
| 2 | \multicolumn{8}{c}{DATA} | | | | | | | |
| 3 | \multicolumn{8}{c}{COMMANDS} | | | | | | | |

F=1 COMMAND PRESENT - SET BY LINE MICROPROCESSOR 56
F=0 COMMAND COMPLETED BY I/O MICROPROCESSOR 36

COMMANDS - WORD 0
    BIT 0 LOAD
    BIT 1 STORE
    BIT 2 GET NEXT BLOCK
    BIT 3 INTERRUPT CPU 2
    BIT 4 BACK SPACE ONE CHARACTER
    BIT 5 TIMER 32
    BIT 6 INITIALIZE
    BIT 7 BACK A LINE

WORD 3
    BIT 0 SPECIAL TIMER

FREE RUNNING TIMER 32

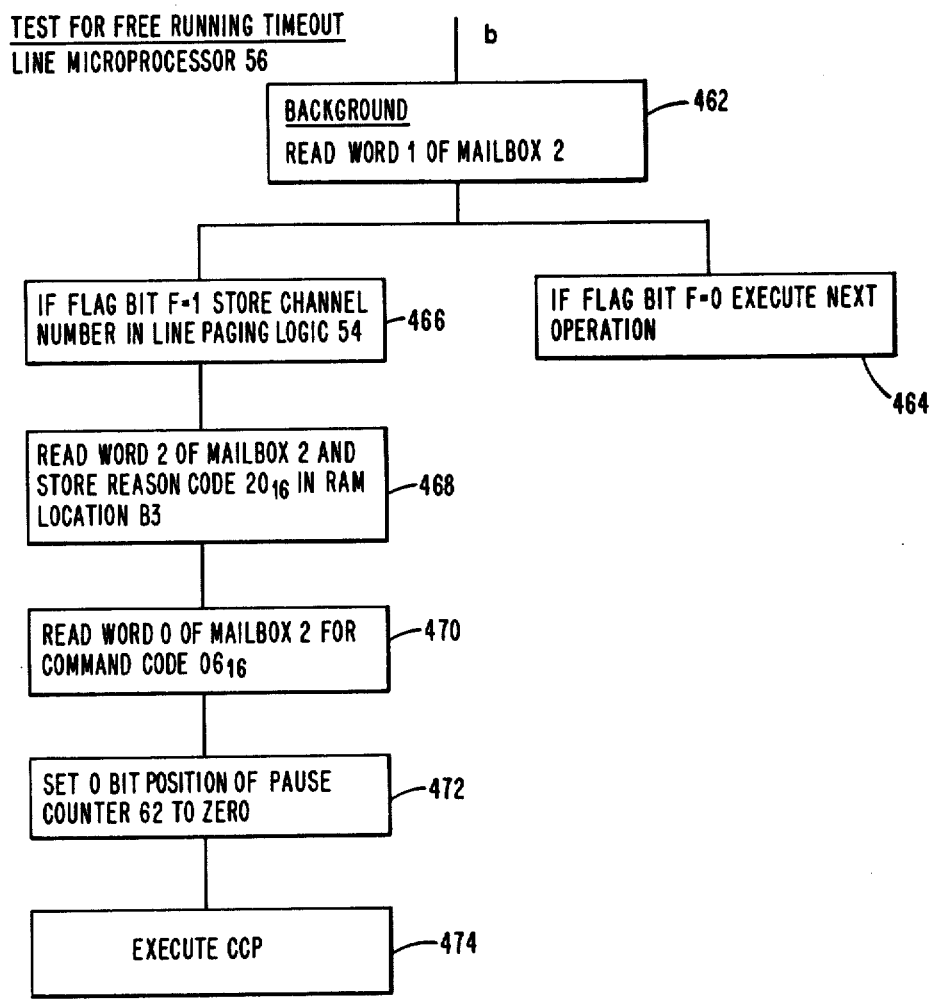
Fig. 7. (sheet 3 of 3)

COMMUNICATION MULTIPLEXER SHARING A FREE RUNNING TIMER AMONG MULTIPLE COMMUNICATION LINES

This application is a continuation of application Ser. No. 191,626, filed Sept. 29, 1980.

RELATED APPLICATIONS

The following U.S. patent applications filed on an even date with the instant application and assigned to the same assignee as the instant application are related to the instant application.
1. "A Communication Multiplexer Having Dual Microprocessors" by Kin C. Yu and Gary J. Goss, filed on Sept. 29, 1980 and having U.S. Ser. No. 192,126 which was abandoned and continued as Ser. No. 512,701, filed on July 11, 1983.
2. "A Communication Multiplexer Having A Variable Priority Scheme Using A Read Only Memory" by Gary J. Goss and Angelo David Kachemov, filed on Sept. 29, 1980 and having U.S. Pat. No. 4,385,382.
3. "A Communication Multiplexer Variable Priority Scheme" by Allen C. Hirtle and Gary J. Goss, filed on Sept. 29, 1980 and having U.S. Pat. No. 4,380,065.
4. "A Communication Multiplexer Having An Apparatus For Establishing A Single Line Priority" by Kin C. Yu and Angelo David Kachemov, filed on Sept. 29, 1980 and having U.S. Pat. No. 4,405,981 issued on Sept. 20, 1983.
5. "A Communication Multiplexer Using A Random Access Memory For Storing An Acknowledge Response To An Input/Output Command From A Central Processor" by Kin C. Yu and Gary J. Goss, filed on Sept. 29, 1980 and having U.S. Ser. No. 192,127.

BACKGROUND OF THE INVENTION

1. Field of the Invention

The present invention relates to data processing systems and more particularly to timing apparatus in a communication subsystem for indicating required time intervals.

2. Description of the Prior Art

In many sophisticated data processing systems, it is important to be able to efficiently control the timing of events to insure optimum utilization of the resources. For example, a central processor manually employs an interval timer which enables it to keep track of the time of day and to interrupt periodically as required. Thus, this allows for the performance of functions such as the timeout of events, the polling of communication networks on a regular basis and the time of day recording.

In many prior art systems, it is encumbent upon the processor to respond to a timeout condition within a maximum time period after receipt of a timer interrupt. Waiting can result in the readout of inactivate time information. Accordingly, the processor is required to interrupt normal processing to respond immediately to each timer produced interrupt.

U.S. Pat. No. 4,090,239 entitled "Interval Timer for Use in an Input/Output System" describes a timer unit including a preset register for storing a processor established count for defining a time interval, an interval counter coupled to the preset register for receiving a count therefrom, and a rollover counter coupled to the interval counter. The timer unit upon detecting each completion of the time interval specified by the preset register generates an interrupt request to a priority network. This timing system requires a preset register and a number of counters. Also, a single processor must initiate the count and also respond to a single interrupt signal.

The hardware required is reduced by the use of a microprocessor controlling communication lines through the use of channel control blocks stored in a memory. Such a system is described in U.S. Pat. No. 4,133,030 entitled "Control System Providing for the Transfer of Data in a Communications Processing System Employing Channel Dedicated Control Blocks". This system, however, limited the throughput by restricting the number of communication lines that could be processed.

It should be understood that the references cited herein are those which the Applicants are aware of and are presented to acquaint the reader with the level of skill in the art and may not be the closest reference to the invention. No representation is made that any search has been conducted by the Applicants.

OBJECTS OF THE INVENTION

Accordingly, it is an object of the invention to provide a communication subsystem with a timing system requiring less processor overload.

It is another object of the invention to provide a communication subsystem with a timing system requiring less hardware.

It is still another object of the invention to provide a communication subsystem with a timing system that does not limit the number of variables being timed.

SUMMARY OF THE INVENTION

A data processing system includes a central processing unit, a main memory and a communication subsystem, all coupled in common to a system bus. The communication subsystem includes a number of devices coupled to a communication controller through a line adapter via a communication channel identified by a channel number.

The communication controller includes a line microprocessor for communicating with the communication channels and a shared memory; and an I/O microprocessor for communicating with the shared memory and via the system bus with the central processing unit and the main memory; and a free running timer.

A communication channel control program (CCP) is stored in a random access memory. The CCP controls the communication channel activity in conjunction with the line microprocessor. The CCP may indicate to the line microprocessor to call for a predetermined CCP routine to query a predetermined channel number after a preset period of time. The line microprocessor will store a binary count indicating the preset period of time and an action code indicating the action the I/O microprocessor is to take in the line microprocessor to I/O microprocessor mailbox in shared memory of the channel number.

The I/O microprocessor is then interrupted by the line microprocessor and reads the information stored in the line microprocessor to I/O microprocessor mailbox. The I/O microprocessor adds the present time of the free running timer to the binary count read from the line microprocessor to I/O microprocessor mailbox and stores the time delay result in a random access memory location associated with the channel number also read from the mailbox. The I/O microprocessor then sets a timer running flag indicating that the free running timer is operative for this channel and releases the line microprocessor to I/O microprocessor mailbox.

The I/O microprocessor in its background compares the present time of the free running timer against the time delay result for each channel number operative in a free running timer mode and resets the timer running flag when the binary value of the free running timer output is equal to or greater than the time delay result. The I/O microprocessor also stores the timer action code in a command byte stored in the random access memory in an address location associated with this channel number.

When the binary value of the free running timer output is equal to or greater than the time delay result, the next time the I/O microprocessor queries this channel number a test of the command byte indicates a timer action code. This results in the I/O microprocessor storing the channel number, a command code and a reason code indicating the timeout condition in the I/O to line microprocessor mailbox address locations in shared memory. The line microprocessor queries the I/O to line microprocessor mailbox and calls for the predetermined CCP routine.

The line microprocessor may set up a number of time delays for each communication channel. The I/O microprocessor will process each of the time delays and indicate to the line microprocessor when these time delays occurred for each communication channel.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is an overall block diagram of the communication controller 10.

FIG. 3 is a logic diagram of the I/O microprocessor 36 and line microprocessor 56 interrupt logic.

FIG. 4 identifies the address locations of the read only memories and the random access memories in communication controller 10.

FIG. 5 shows the layout of the mailboxes in shared memory 44.

DESCRIPTION OF THE PREFERRED EMBODIMENT

Figure 1:
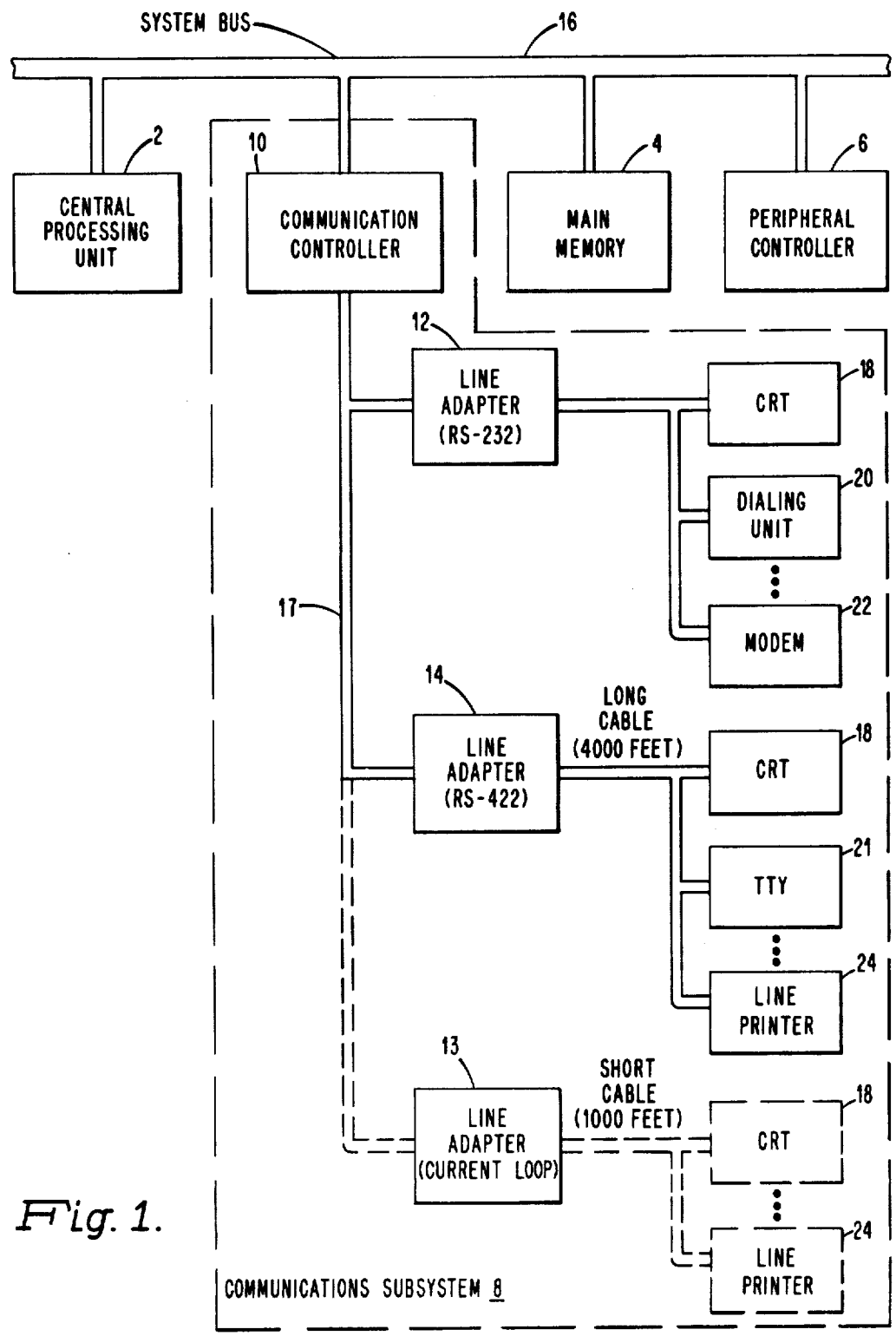
FIG. 1 is an overall block diagram of the data processing system.

FIG. 1 shows a block diagram of the overall data processing system including a central processing unit (CPU) 2, a main memory 4, a communication subsystem 8 and typically a peripheral controller 6, all coupled in common to a system bus 16.

The communication subsystem 8 may be operative with a maximum of 16 communication lines and includes a communication controller 10 coupled to system bus 16, and a plurality of line adapters with their associated devices coupled to the communication controller 10 by a line adapter bus 17.

Typically, communication subsystem 8 may include a line adapter 12 having RS232 interfaces, a line adapter 14 having RS422 interfaces or a line adapter 13 having current loop interfaces. Line adapter 14 has the capability of driving up to 4000 feet of cable and line adapter 13 has the capability of driving up to 1000 feet of cable.

The RS232 interface is described in "EIA RS-232C" dated 1979 and published by the Electronics Industries Association, 2001 I Street, N.W., Washington, DC.

The RS422 interface is described in "EIA RS-422" dated 1975 and also published by the above Electronics Industries Association.

The current loop interface is described in the "Bell System Communication—Technical Reference—45, 55 and 75 Baud Printer Line Channels—Interface Specification" which is dated December, 1967 and published by AT&T.

Typical devices operative with the communication controller 10 include a cathode ray tube display (CRT) 18, a dialing unit (801C) 20, a MODEM (202C) 22, a teletype unit (TTY33) 21, and a line printer 24.

Line adapters 13 and 14 may each service up to eight asynchronous lines; line adapter 12 may service up to eight asynchronous lines or up to six asynchronous lines and one synchronous line. However, only two line adapters servicing a maximum of 16 lines may be operative with the communication controller 10.

FIG. 2 shows a block diagram of communication controller 10 which includes an I/O microprocessor 36 which controls the operation of the communication controller 10 with CPU 2 and main memory 4 over system bus 16, and line microprocessor 56 which controls the operation of the communication controller 10 with the line adapters 12 and 14 over line adapter bus 17.

The I/O microprocessor 36 and the line microprocessor 56 communicate with each other through a shared random access memory (RAM) 44 which stores the line control tables (LCT) and communication control blocks (CCB) and a number of mailboxes. Each of the devices is assigned an LCT. Half of the LCT controls the device in a receive mode and the other half of the LCT controls the device in a transmit mode. Similarly, each of the devices is assigned a CCB for each receive block transfer with main memory 4, and a CCB for each transmit block transfer with main memory 4. The LCT and CCB operations are described in the aforementioned U.S. Pat. No. 4,133,030 which is hereby incorporated by reference.

Line control tables identify the number of bits in the device data character, whether the character is odd or even parity, the cycle redundancy check (CRC) formula used and the CRC bytes being developed, the status of the device and pointers to enable the LCT to be operative with a channel control program (CCP).

The CCB stores the main memory 4 address location for the next character either transmitted or received, and the number of characters remaining for processing in the current block. The CCB also stores a control word indicating the last block for transmission, if the CCB was executed, and whether to generate an interrupt upon completion of a block, and a number of status bits indicating the line status at the time the CCB completed. Up to four receive CCB's and up to four transmit CCB's may be stored per device.

A programmable read only memory (PROM) 38 stores the programs that operate with the I/O microprocessor 36. The I/O microprocessor generates signals indicative of an address location in PROM 38 and sends the signals via an I/O paging logic 34 and an I/O address bus 18 to PROM 38. An instruction at that address location is transferred from PROM 38 to the I/O microprocessor 36 via an I/O data bus 74. The I/O microprocessor 36 executes that instruction and generates the address signals indicating the next address location of PROM 38 to read the next instruction over I/O data bus 74.

A work RAM 40 operates with the I/O microprocessor 36 as a scratchpad memory for storing variable data, for stack operation, i.e., storing the return address of an interrupted microprogram, and for providing working storage for data manipulation.

The I/O paging logic 34 receives a virtual address from I/O microprocessor 36 when the I/O microprocessor addresses the LCT or CCB area of shared memory 44 and generates a real address for identifying a location with the LCT or CCB area of a particular channel associated with a selected device. The paging operation is described in U.S. Pat. No. 4,290,104 issued Sept. 15, 1981 entitled "Paging Mechanism".

A bus interface 30 couples the communication controller 10 to the system bus 16 for operation with main memory 4 and CPU 2. The bus request, bus acknowledge, and bus priority operations are described in U.S. Pat. No. 3,993,981 entitled "Apparatus for Processing Data Transfer Requests in a Data Processing System" which is hereby incorporated by reference. Bus interface 30 also provides storage for data and I/O commands that are transferred over system bus 16.

A RAM 60 stores the channel control program (CCP) which processes the data stream of a communication channel. A CCP pointer in the LCT points to the next CCP location in RAM 60 to be referenced by the channel when a channel request interrupt is serviced. The CCP typically controls the transfer of characters between a line adapter interface 66 and shared RAM 44 through line microprocessor 56, performs the check redundant character computation and performs minor editing.

A PROM 58 stores the programs that operate with the line microprocessor 56. The line microprocessor 56 generates address signals indicating an address location in PROM 58 and sends the address signals via a line paging logic 54 and a line address bus 70 to PROM 58. An instruction at that address location is transferred from PROM 58 to line microprocessor 56 via a line data bus 72. The line microprocessor 56 executes that instruction and generates the address signals indicating the next address location of PROM 58 to read the next instruction over line data bus 72.

A work RAM 52 operates as a scratchpad memory for line microprocessor 56 as does work RAM 40 for I/O microprocessor 36.

Line paging logic 54 receives a virtual address which is converted into a real address when addressing the LCT or CCB areas in shared RAM 44. As with I/O paging logic 34, line paging logic 54 allows a single program to address the LCT or CCB associated with any communication channel (2 channels per line: a receive channel and a transmit channel).

An S register 50 is a one byte index register which is operative with PROM 58.

A pause timer 62 detects if a CCP is running too long by counting the number of accesses to RAM 60. If the number of accesses exceeds a predetermined number, typically 100, the line microprocessor 56 is interrupted, the CCP is temporarily deactivated, and a CCP return address is stored in a queue in work RAM 52.

A priority scan 64 accepts data requests associated with each channel of the device adapters and establishes the priorities for servicing the channels in a dynamically variable sequence. This is described in copending related U.S. Pat. No. 4,385,382 entitled "A Communication Multiplexer Having A Variable Priority Scheme Using A Read Only Memory" and U.S. Pat. No. 4,380,065 entitled "A Communication Multiplexer Variable Priority Scheme".

The line adapter interface 66 couples the line adapters 12 and 14 to the communication controller 10 through line adapter bus 17.

The I/O microprocessor 36 implements a number of functions including the handling of I/O instructions from the CPU 2 to the communication controller 10 and the controlling of the transfer of data between line microprocessor 56 and main memory 4. Line microprocessor 56 in conjunction with PROM 38 acts as an interpreter of the CCP. When a CCP instruction which requests a byte to be transferred to/from main memory 4 is decoded by line microprocessor 56, it stores the number of the channel currently being serviced and the data byte of the transfer in the mailbox in shared memory 44. The line microprocessor 56 generates an interrupt through an interrupt logic 78 to the I/O microprocessor 36. The I/O microprocessor 36 in conjunction with PROM 38 will address the mailbox in shared RAM 44 for the channel number and command code as well as the data byte, if this is a receive operation, and address the current CCB of this channel via I/O paging logic 34 for the current main memory address. The I/O microprocessor 36 will transfer the memory address and the data byte to bus interface 30 where the main memory 4 address and the data byte are stored awaiting an acknowledge in response to a bus request for transfer to main memory 4.

Interrupt logic 78 is also responsive to signals from bus interface 30 to interrupt the I/O microprocessor to accept system bus 16 information addressed to communication controller 10.

Interrupt logic 78 is also responsive to a signal from pause timer 62 to interrupt line microprocessor 56 when the number of CCP instructions exceeded the predetermined number; responsive to a signal from priority scan 64 to interrupt line microprocessor 56 to start a polling of the devices; and responsive to a signal from line adapter 66 to interrupt the line microprocessor 56 when a device responds to the poll.

The I/O microprocessor 36, in conjunction with a free running timer 32, may indicate to the line microprocessor 56 to start a predetermined operation after a time delay determined by the line microprocessor 56.

A clock system 76 generates the phase 1 and phase 2 clock signals for I/O microprocessor 36 and line microprocessor 56 as well as a number of timing signals which are described infra.

The I/O microprocessor 36 when receiving an I/O command from CPU 2 may generate an I/O instruction to line microprocessor 56 through a mailbox in shared memory 44 in order to control the CCP stored in RAM 60. This is described in copending related U.S. Application Ser. No. 192,127 entitled "A Communication Multiplexer Using A Random Access Memory For Storing An Acknowledge Response To An Input/Output Command From A Central Processor".

A transceiver (XCVR) 46 and a XCVR 48 isolate the I/O data bus 74 from the line data bus 72. Similarly, a MUX and control 42 isolates the I/O address bus 68 from the line address bus 70 and couples shared RAM 44 to either I/O address bus 68 or line address bus 70.

Referring to FIG. 3, signal LREADY-01 or LREADY-02 at logical ZERO indicates that a device on a communication line coupled to line adapter 12 or 14 requests service by responding to the poll by priority scan 64. Forcing signal LREADY- to logical ZERO resets a flop 100 on the rise of a clock signal PRICLK-. Output signal LRDYSY- at logical ZERO is applied to an input of a NAND gate 102. Signal STLOAD-, the output of priority scan 64, is at logical ZERO during the polling operation as described in copending related U.S. Pat. No. 4,385,382 entitled "A Communication Multiplexer Having A Variable Priority Scheme Using A Read Only Memory".

A flop 106 sets on the next rise of clock signal PRICLK- since the D input signal HITVAL+, the output of a NAND gate 102, is at logical ONE. This forces the output signal UP2IRQ- to logical ZERO, thereby forcing line microprocessor 56 into an interrupt sequence. Line microprocessor 56 generates addresses $FFF8_{16}$ and $FFF9_{16}$ on address lines U2AD00+00 through U2AD15+00 through line paging logic 54 onto line address bus 70 and begins to process instructions stored in PROM 58 and CCP's stored in RAM 60. Signal PRSCCP- is forced to logical ZERO by logic responsive to address signals $FFF8_{16}$ and $FFF9_{16}$ in line paging logic 54. This sets a flop 108. Signal CCPRUN- at logical ZERO resets flop 106 and signals the priority scan 64 that the CCP is active. Interrupt signal UP2IRQ- is forced to logical ONE.

The CCP's control the operation of the communication lines. Each instruction of the CCP calls for a program routine in PROM 62. Line microprocessor 56 performs the instructions of the program routine to perform the CCP instruction.

When the line microprocessor 56 has completed its operation with the communication line, it generates an address $00F1_{16}$. Line paging logic 54 is responsive to address $00F1_{16}$ and generates signal LNMREF- at logical ZERO. A decoder 164 is activated and signal LRQIRQ- is forced to logical ZERO. This sets a flop 166 and output signal UP1IRQ- at logical ZERO forces I/O microprocessor 36 into an interrupt mode.

I/O microprocessor 36 generates addresses $FFF8_{16}$ and $FFF9_{16}$. Signal U1CRIQ- from I/O paging logic 34 is responsive to address $FFF8_{16}$ and resets flop 166. The I/O microprocessor 36 is controlled by the program routine stored in PROM 38 to process data in accordance with command signals stored in the mailbox in shared memory 44 by line microprocessor 56.

The CPU 2 may control the communication controller 10 by sending I/O commands over system bus 16. These I/O commands set up the LCT's and CCB's or read the LCT's and CCB's. As an example, one input/output command will set the main memory 4 address in a CCB. Another input/output command will set the range in that CCB. The input/output command operation is described in copending related U.S. Application Ser. No. 192,127 entitled "A Communication Multiplexer Using A Random Access Memory For Storing An Acknowledge Response To An Input/Output Command From A Central Processor".

Bus interface 30 generates signal IOCMMD+ when an input/output command is received from CPU 2 over system bus 16. Output signal IOCMMD+ sets a flop 128 on the rise of timing signal MYD100+ from bus interface 30. Interrupt signal UP1NMI- at logical ZERO is applied to the non-maskable interrupt input terminal of I/O microprocessor 36 which generates interrupt vector addresses $FFFC_{16}$ and $FFFD_{16}$. The input/output command includes a function code which modifies interrupt vector address $FFFC_{16}$ in the I/O paging logic 34 to point to an address location in PROM 38 which stores the starting address of the program which executes the input/output command specified by the function code. Interrupt vector address $FFFC_{16}$ generates signal NM1CLR- in I/O paging logic 34 to reset flop 128.

A flop 126 sets on the rise of the TBORW1- signal from pause timer 62 when the pause timer 62 times out. Interrupt signal UP2NMI- at logical ZERO is applied to the non-maskable interrupt terminal of line microprocessor 56 which generates interrupt vector addresses $FFFC_{16}$ and $FFFD_{16}$. The contents of address locations $FFFC_{16}$ and $FFFD_{16}$ in PROM 58 generate a program address for processing the pause timer 62 time out. Flop 126 is reset during a stop timer or a WAIT instruction when signal PTMRSB-, the output of decoder 164, is forced to logical ZERO.

A number of timing and control signals are applied to the input terminals of I/O microprocessor 36 and line microprocessor 56. Signals P1PHZ1+, P1PHZ2+, P2PHZ1+ and P2PHZ2+ applied to the $\phi1$ and $\phi2$ terminals provide the basic timing. Signal CKPHZA- applied to the F2 terminal enables the data bus during a microprocessor write cycle and disables the data bus during a microprocessor read cycle. The signals P1HALT- and P2HALT- at logical ZERO applied to the HALT terminal will halt the microprocessor after the instruction is executed. Signal MSTCAD- applied to the R terminal starts the microprocessor when power is turned on.

FIG. 4 identifies the address locations of the various memories that are operative with either the I/O microprocessor 36 (I/O side), the line microprocessor 56 (line side), or both the I/O microprocessor 36 and the line microprocessor 56 (shared). Work RAM's 40 and 52 are responsive to address signals $0000_{16}$ through $03FF_{16}$ received from I/O address bus 68 and line address bus 70 respectively.

Shared memory 44 is responsive to address signals $0400_{16}$ through $0FFF_{16}$ received from I/O address bus 68 or line address bus 70. Shared memory 44 has 3,072 address locations: 1,024 address locations for storing CCB's for 16 communication lines, 1,024 address locations for storing LCT's for 16 communication lines, 10 address locations for storing mailboxes and the remaining address locations for storing extra LCT's. Each communication line is operative with CCB's 44a in 64 address locations: 32 address locations for the communication line as a receive channel and 32 address locations for the communication line as a transmit channel. Each receive channel CCB and each transmit channel CCB includes 8 bytes storing 3 bytes of main memory 4 address location, 2 bytes of range, 1 byte of control and 2 bytes of status. Each LCT 44c includes 32 address locations of receive channel configuration and control information and 32 address locations of transmit channel configuration and control information.

RAM 60 includes 16,384 locations, with addresses $1000_{16}$ through $4FFF_{16}$ for storing CCP instructions which are under the control of line microprocessor 56.

PROM 38 has 3,072 locations, with addresses F400$_{16}$ through FFFF$_{16}$ for storing program instructions that operate with I/O microprocessor 36. PROM 58 has 4,096 locations, with addresses F000$_{16}$ through FFFF$_{16}$ for storing program instructions that operate with line microprocessor 56.

Each channel has associated with it four 8 byte CCB's 44b, each including 3 bytes of main memory 4 address of the next data byte to be processed by that channel, 2 bytes of range, the number of data bytes remaining in the field, 1 control byte and 2 status bytes.

The CCB control byte includes an "interrupt on status complete" bit, a "valid CCB" bit and a "last block" bit.

The CCB final status bytes include bits indicating:

Bit position (0 = most significant bit)

0: The CCP executes a CPU 2 interrupt instruction.
1: An interrupt was generated for this CCB.
2: Data Service Error.
3: CCB was executed and status is complete.
4: CCB Service Error since CCB not available.
5,6: Flag between CCP and CPU 2.
9: Data Clock Error.
10: Range not equal to zero when in receive mode. Last block bit of CCB control word set in transmit mode.
11: Data set status changed.
12: Memory 4 error corrected.
13: Invalid memory 4 address.
14: System bus 16 parity error.
15: Uncorrected memory 4 error.

The I/O microprocessor 36 and line microprocessor 56 communicate with each other by means of mailboxes stored in locations in shared RAM 44. The contents of these mailbox locations are shown in FIG. 5.

The communication controller 10 uses three mailboxes: (a) block mode commands, (b) I/O microprocessor 36 commands to line microprocessor 56, and (c) line microprocessor 56 commands to I/O microprocessor 36.

The CPU 2 may initiate a block read operation or a block write operation by means of I/O commands. As a result of the input/output command when the mailbox is available (F = logical ZERO), the block mode command mailbox is set up with an address in the line microprocessor address space. This is the address of the first location to receive a byte from shared memory 44 if the D bit, bit 7 of word 0, is at logical ZERO, or from which to transmit a byte to shared memory 44 if the D bit is at logical ONE.

Bit positions 3 through 6 of word 0 specify the channel number of the communication line requiring the block transfer. The CCB stored in shared memory 44 associated with that channel specifies the starting main memory 4 address and the range, the number of bytes in the block, involved in the block transfer.

The R bit, bit 1 of word 0, when at logical ONE specifies a main memory 4 block read operation and when at logical ZERO, a main memory 4 block write operation.

The F bit, bit 0 of word 0, is set to logical ONE by I/O microprocessor 36 to specify that a command is present, and is reset to logical ZERO by the line microprocessor 56 when the command is completed.

The line microprocessor 56 scans word 0 of block mode command mailbox. If bit 0 of word 0 is at logical ONE, then the line microprocessor 56 initiates a firmware routine which identifies the channel number and determines if this is a read or write operation. If this is a read operation, then the STORE subroutine is processed. If this is a write operation, then the LOAD subroutine is processed. When the range as stored in the CCB for this channel number reaches ZERO, the line microprocessor 56 resets the F bit, bit 0 of word 0, and terminates this block mode operation.

The I/O microprocessor 36 commands to line microprocessor 56 mailbox 2 specifies the action the line microprocessor 56 is to take and the reason for the action. Word 0 specifies the action code. Action code 00$_{16}$ specifies a stop I/O command which prevents any further channel activity by halting the CCP program and preventing further data-generated channel request interrupts from the channel specified in word 1.

Action code 02$_{16}$ initializes the channel by clearing the CCB's and LCT's associated with the channel number specified in word 1.

Action code 04$_{16}$ starts the CCP execution at an address specified by the LCT words 6 and 7 associated with the channel specified in word 1. This LCT address is specified by CPU 2 initially by an I/O command.

Action code 06$_{16}$ starts the CCP execution as the result of an interrupt from a communication channel. The CCB for that channel specifies the starting CCP address location.

Word 2 of the I/O microprocessor 36 commands to line microprocessor 56 mailbox 2 specifies the reason code. Bit 0 at logical ONE indicates a channel request interrupt.

Bit 1 identifies a data set scan operation. The data scan routine compares the present status with the old status stored in LCT 14. A difference indicates that a particular channel status has changed. The contents of LCT 8 then determine the action the line microprocessor 56 will take.

Bit 2 indicates that the timer 62 which was set by the CCP has timed out.

Bit 7 indicates the direction of the line, receive or transmit.

The line microprocessor 56 reads the F bit of word 1. When bit 0 is at logical ONE, the line microprocessor 56 reads word 0 and branches to a subroutine specified by the action code. Bit 0 of word 1 is reset to logical ONE when the action is completed.

The line microprocessor 56 commands to I/O microprocessor 36 mailbox 3 is active during a request by a line adapter 12 or 14 for service causing the line microprocessor 56 to start the processing of the CCP instruction specified by the commands stored in the mailbox 3.

Bit position 0 of word 0 of mailbox 3 at logical ONE specifies a load DMA read from main memory 4 command at an address specified by the CCB of the channel number stored in word 1 of mailbox 3.

The data bytes read from memory are stored in word 2 of the line microprocessor 56 command to I/O microprocessor 36 mailbox 3. Line microprocessor 56 processes the data bytes in accordance with the CCP as each data byte is stored in the mailbox under control of the I/O microprocessor 36.

Bit position 1 of word 0 at logical ONE specifies a store DMA write into main memory 4 at an address specified by the CCB of the channel number stored in word 1. The data bytes are stored in word 2 of the mailbox 3 under control of line microprocessor 56 and transferred to main memory 4 via system bus 16 under control of I/O microprocessor 36.

Bit position 2 of word 0 at logical ONE specifies a get next block (GNB) command. This indicates to the I/O microprocessor 36 that the block transfer is complete and to clear the CCB control field.

Bit position 3 of word 0 at logical ONE results in the I/O microprocessor 36 interrupting CPU 2 and in conjunction with bit position 2 at logical ONE (GNB) will result in an I/O command from the CPU 2 loading the CCB for another block transfer.

Bit position 4 of word 0 at logical ONE indicates a backspace one character operation. A CRT 18 operated may want to correct a character.

Bit position 5 of word 0 at logical ONE indicates that the timer 32 is in an "ON" condition.

Bit position 6 of word 0 at logical ONE indicates an initialize operation.

Bit position 7 of word 0 at logical ONE indicates the backing up of a line. The CRT 18 operator may want to correct a line.

Bit position 0 of word 3 indicates a special 200 millisecond pause timer 62 operation.

Figure 6:
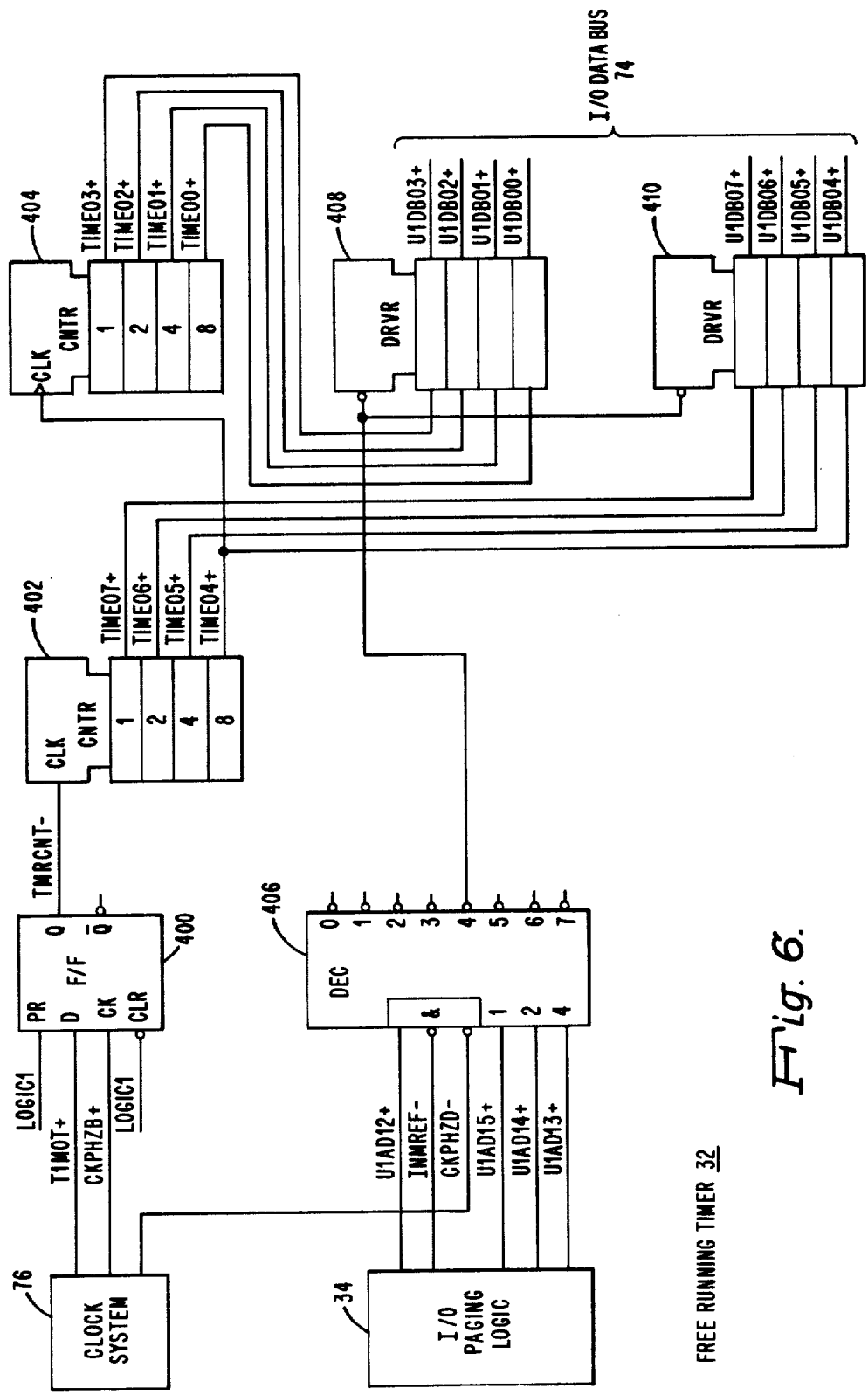
FIG. 6 is a logic diagram of the free running timer 32.

FIG. 6 is a logic diagram of free running timer 32. Clock system 76 generates a free running square wave signal at logical ONE for 50 milliseconds and at logical ZERO for 50 milliseconds which is applied to the D terminal of a flop 400. The CKPHZB+ clock signal rises typically every 500 nanoseconds and is applied to the clock terminal. Signal TMRCNT−, the output of flop 400, rises approximately every 100 milliseconds and is applied to a clock terminal of a counter 402. Counters 402 and 403 provide a binary count by means of output signals TIME00+ through TIME07+.

A decoder 406 is enabled when I/O paging logic 34 receives address signal 00FC$_{16}$. This forces signals U1AD12+ and U1AD13+ to logical ONE and signals INMREF−, U1AD14+ and U1AD15+ to logical ZERO. When clocking signal CKPHZD− is at logical ZERO, output signal FTMRSB− is forced to logical ZERO, enabling drivers 408 and 410. This places the output of counters 402 and 404, signals U1DB00+TR through U1DB07+TR, on the I/O data bus 74 for storage in word RAM 40 at address location XXFC$_{16}$. The I/O paging logic 34 generates an address location XXFC$_{16}$ for each channel number for storing the output of counters 402 and 404.

Figure 7:
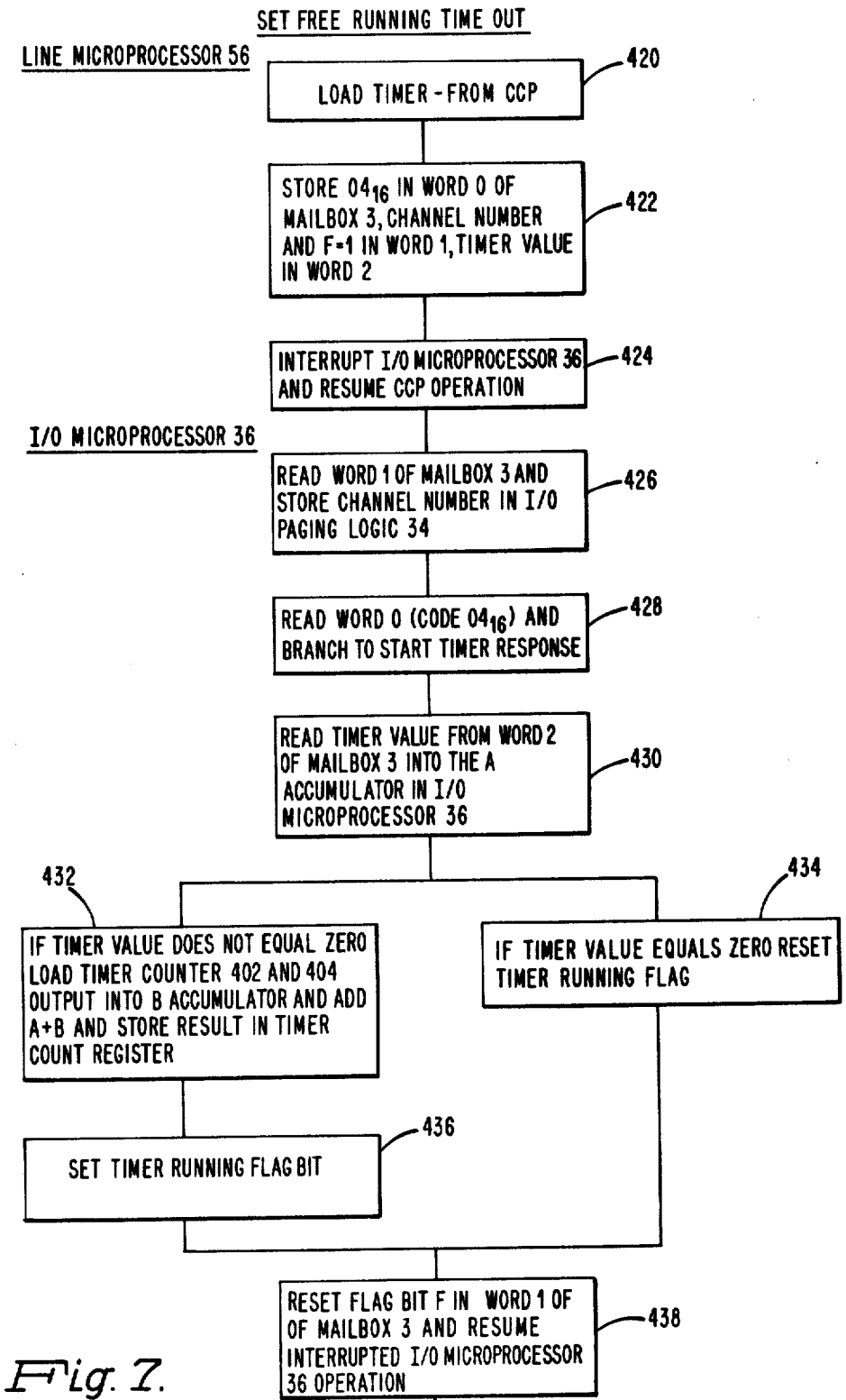
FIG. 7 is a block diagram of the free running timer operation in the communication subsystem.
Figure 7:
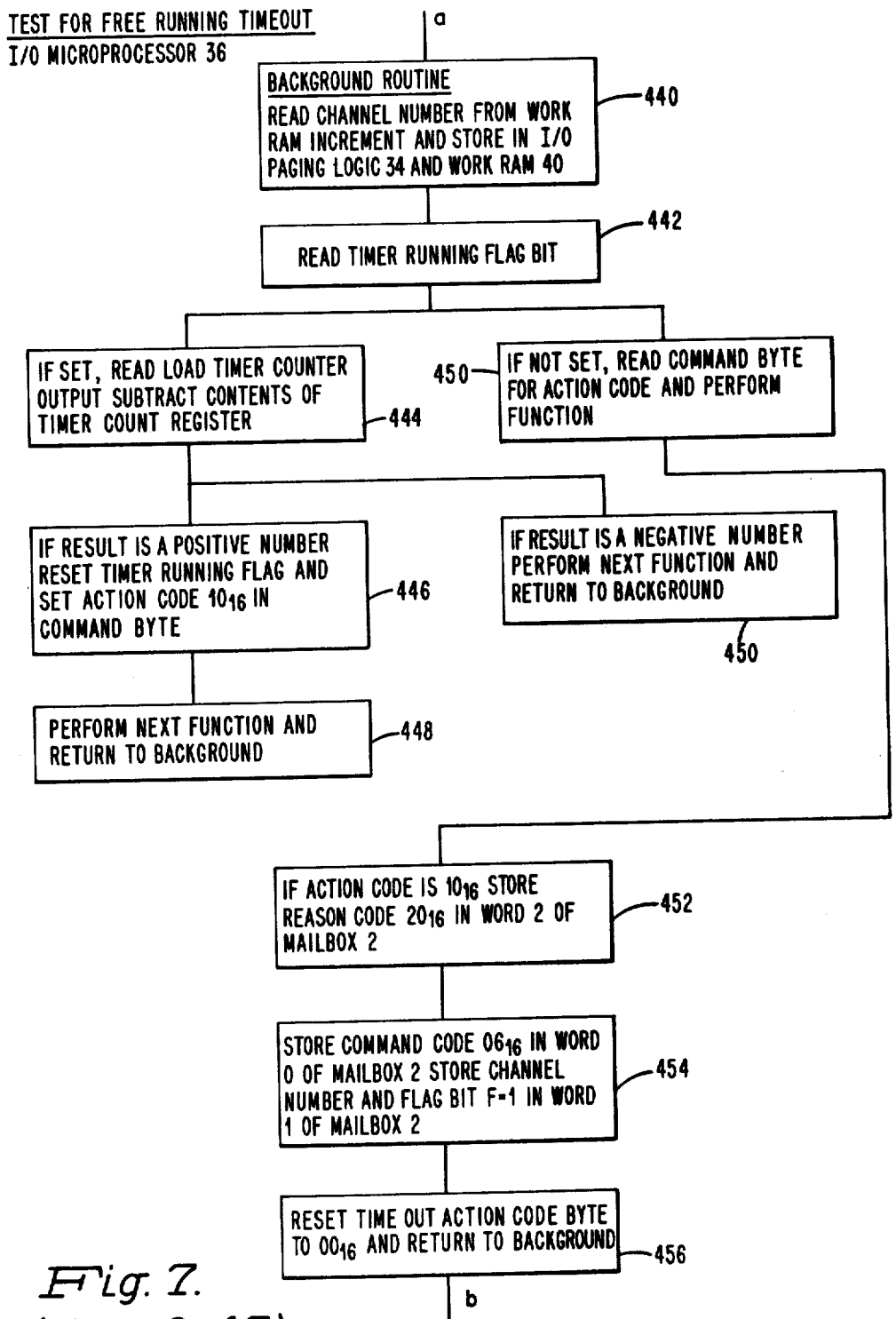

FIG. 7 is a flow chart of the free running timer 32 operation. The line microprocessor 56 controls the receiving of a binary value from a CCP and executing a load timer operation. The binary value is a measure of the time after which the line microprocessor 56 will perform a predetermined operation, typically a scan of a communication channel.

A CCP will call for a load free running timer 32 operation which the line microprocessor 56 will receive in block 420 from RAM 60.

Under line microprocessor 56 control, mailbox 3 in shared memory 44 is loaded in block 422 as follows. Word 0 is loaded with an 04$_{16}$ command code indicating a timer operation. Word 1 is loaded with the channel number of the communication channel to be queried and the flag bit F is set. Word 2 is loaded with the binary value. This binary value is ZERO if the I/O microprocessor 36 is to stop the timer operation for this communication channel.

In block 424, the I/O microprocessor 36 is interrupted and the line microprocessor 56 resumes its CCP operation. The line microprocessor 56 generates an address 00F1$_{16}$. Decoder 164 of FIG. 3 is responsive to the address F1$_{16}$ to generate output signal LRQIRQ- which sets flop 166 and forces interrupt signal UP1IRQ- to logical ZERO. I/O microprocessor 36 is responsive to the interrupt signal UP1IRQ- to generate interrupt vector addresses FFF8$_{16}$ and FFF9$_{16}$. The contents of address locations FFF8$_{16}$ and FFF9$_{16}$ in PROM 38 point to the IRQ Handler Routine in PROM 38 which in block 426 reads word 1 of mailbox 3 and stores the channel number in a register (not shown) in I/O paging logic 34.

Word 0 of mailbox 3 is read and the I/O microprocessor 36 is responsive to the action code 04$_{16}$ to branch a start timer operation in block 428.

In block 430, the timer value is read from word 2 of mailbox 3 and stored in the A accumulator of I/O microprocessor 36.

If the timer value in word 2 was not binary ZERO, then in block 432 load the output of counters 402 and 404, FIG. 6, into the B accumulator of I/O microprocessor 36 by generating address 00FC$_{16}$ over I/O address bus 68. This forces the output signal FTMRSB− of decoder 406 to logical ZERO, enabling drivers 408 and 410 and signals U1DB00+TR through U1DB07+TR are transferred to the B accumulator of I/O microprocessor 36 over I/O data bus 74. The contents of the A accumulator and B accumulator are added and the result is stored in a timer count location in work RAM 40.

The timer running flag word for the channel number stored in word 1 is read from work RAM 40, the timer running flag bit is set in block 436.

If the timer value in word 2 of mailbox 3 equals binary ZERO, then the timer operation for this channel number is turned off in block 434 by resetting the timer running flag bit for this channel number in work RAM 40.

In block 438, the flag bit F is reset in word 1 of mailbox 3 and the I/O microprocessor 36 resumes its interrupted operation. The flag bit F=0 indicates to line microprocessor 56 that mailbox 3 is available for use.

The I/O microprocessor 36 in a background mode in block 440 reads a channel number stored in a scan channel location in work RAM 40, increments the channel number and stores the incremented channel number into a register (not shown) in I/O paging logic 34.

In block 442, the timer running flag word is read from work RAM 40 and the flag bit tested. If in block 444 the timer running flag bit is set, indicating that this channel number is in a free running timer 32 mode, then the I/O microprocessor 36 generates an address 00FC$_{16}$ which loads the output of counters 402 and 404 into the A accumulator of I/O microprocessor 36. The contents of the timer count location in work RAM 40 is subtracted from the contents of the A accumulator and the sign bit of the result tested. If the result is a negative number in block 450, the contents of the timer count location is greater than the counters 402 and 404 output and the I/O microprocessor 36 executes the remaining functions of the channel before returning to the background mode for the next channel.

If the result is a positive number in block 446, indicating a timeout condition, then in block 440 the timer running flag is reset and an action code of 10$_{16}$ is stored in a command byte location in work RAM 40. In block 448, the I/O microprocessor 36 performs the remaining functions and returns to the background mode.

If in block 442 the timer running byte is not set, then in block 450 the I/O microprocessor 36 reads the contents of the command byte register in work RAM 40 for the action code. If the action code is $10_{16}$, indicating that a timeout occurred the previous time this channel number was processed by the I/O microprocessor 36, then in block 452 the reason code $20_{16}$ is stored in word 2 of mailbox 2 indicating a timer operation. The channel number and flag bit, F=1, are stored in word 1 of mailbox 2.

In block 456, the timeout action code is reset in the command byte of work RAM 40 and the I/O microprocessor 36 returns to the background mode.

The line microprocessor 56 in the background mode in block 462 reads word 1 of mailbox 2. If the flag bit F is not set, indicating that the I/O microprocessor 36 has no message for the line microprocessor 56, then the line microprocessor 56 continues in the background mode.

If the flag bit of word 1 of mailbox 2 is set in block 466, indicating that the I/O microprocessor 36 has a message, then the channel number is stored in the channel number register (not shown) in line paging logic 54. Word 2 of mailbox 2 is read in block 468 and the reason code $20_{16}$ stored in the reason code location in work RAM 52. Word 0 of mailbox 2 is stored in block 470 for the command code. If the command code is $06_{16}$, indicating a start I/O operation from the free running timer 32, then in block 472 the pause timer 62 is reset to ZERO and in block 474 the CCP which is called for by the free running timer 32 timeout is executed.

The following logic circuits are described in the *TTL Data Book for Design Engineers,* Second Edition, Copyright 1976, by Texas Instruments Inc.

| Flops | 100, 128 | 74S74 |
|---|---|---|
| | 106 | 74LS74 |
| | 108, 126, 166 | 74LS112 |
| | 400 | 74LS74 |
| Decoder | 164 | 74LS138 |
| | 406 | 74S138 |
| | 408, 410 | 74LS241 |

Microprocessors 36 and 56 are Motorola 6800B circuits described in *The Complete Microcomputer Data Catalog,* Copyright 1978, by Motorola Semiconductor Products Inc., Box 20912, Phoenix, Ariz.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a central processor unit, a main memory and a communication controller, all coupled in common to a system bus, a plurality of communication channels, each coupled to said communication controller, said communication controller transferring data bytes between said main memory and said plurality of communication channels and generating a plurality of timeout conditions for each of said plurality of communication channels, said communication controller comprising:

free running timer means for generating a sequence of timing signals representative of consecutive binary numbers;

line microprocessor means coupled to said plurality of communication channels and having means for generating one of a plurality of binary count signals indicative of a time delay for a predetermined communication channel and channel number signals specifying said predetermined communication channel after which said line microprocessor means will initiate a predetermined event, said line microprocessor means further having means for generating an interrupt signal for indicating that said line microprocessor means has loaded a shared memory means with said one of said plurality of binary count signals;

said shared memory means coupled to said line microprocessor means and including first means for storing said one of said plurality of binary count signals and said channel number signals;

I/O microprocessor means coupled to said line microprocessor means, said shared memory means and said free running timer means, and having control store means responsive to said interrupt signal for generating a plurality of microwords, said I/O microprocessor means being responsive to a first microword for receiving from said first storing means said one of said plurality of binary count signals indicative of a first binary number, said I/O microprocessor means having means for receiving a first of said sequence of timing signals indicative of a second binary number in response to a second microword, and having means for adding said first and said second binary numbers and generating signals representative of a resulting third binary number in response to a third microword, said I/O microprocessor means further having means for comparing said third binary number and a subsequent second binary number and generating first signals indicative of said third binary number being equal to or less than said subsequent second binary number in response to a fourth microword;

said line microprocessor means being responsive to said first signals for generating a predetermined sequence of operations in accordance with one of said plurality of timeout conditions for said predetermined channel.

2. The communication controller of claim 1 wherein said free running timer means comprises:

a free running clock for generating a serial sequence of clock signals;

counting means responsive to said clock signals for generating said sequence of timing signals;

decoder means responsive to a predetermined plurality of address signals from microprogram means of said I/O microprocessor means for generating a store signal, said predetermined plurality of address signals being generated by said I/O microprocessor means in response to an instruction from a channel control program; and driver means coupled to said counting means and said decoder means and responsive to said store signal for transferring said sequence of timing signals indicative of said second binary number and said subsequent second binary number to said I/O microprocessor means, said second binary number indicative of a first of said sequence of timing signals on an I/O data bus to said adding means.

3. The communication controller of claim 2 wherein said line microprocessor means comprises:
- a line data bus for transferring line data signals;
- a line address bus for transferring line address signals;
- a line random access memory coupled to said line data bus and said line address bus and storing instructions representative of a channel control program;
- a line microprocessor coupled to said line data bus and said line address bus and having means for generating a first plurality of said line address signals for reading a plurality of said line data signals representative of said instructions stored in said line random access memory for generating said one of said plurality of binary count signals, and having means for generating a second plurality of said line address signals for writing said one of said plurality of binary count signals in said shared memory means; and
- interrupt means coupled to said line address bus and responsive to said means for generating a predetermined set of said line address signals from said line microprocessor for generating said interrupt signal.

4. The communication controller of claim 3 wherein said I/O microprocessor means comprises:
- an I/O data bus for transferring I/O data signals;
- an I/O address bus for transferring I/O address signals;
- an I/O read only memory coupled to said I/O data bus and said I/O address bus for storing said plurality of microinstructions;
- an I/O microprocessor coupled to said I/O data bus and said I/O address bus and responsive to said interrupt signal for generating a first plurality of address signals on said I/O address bus; and
- said I/O read only memory being responsive to said first plurality of address signals for transferring a plurality of data signals representative of said plurality of microinstructions;
- said I/O microprocessor being responsive to said data signals and including said first means for receiving said first binary number from said shared memory means, said second means for receiving said second binary number from said free running timer means and said means for adding said first binary number and said second binary number and generating said signals representative of said resulting third binary number;
- said I/O microprocessor further generating a second plurality of address signals;
- an I/O random access memory coupled to said I/O address bus and said I/O data bus for storing said signals representative of said resulting third binary number received over said I/O data bus at a memory location identified by said second plurality of address signals received over said I/O address bus;
- said I/O microprocessor being responsive to said data signals for generating said second plurality of address signals for reading out said signals representative of said resulting third binary number from said I/O random access memory, said comparing means being responsive to said third binary number and said subsequent second binary number from said second means and generating said first signals.

5. A communication subsystem for transferring data bytes between a main memory and a plurality of communication channels by means of a communication multiplexer coupled to said main memory and said plurality of communication channels for controlling the transfer of said data bytes and for generating a plurality of timeout conditions indicative of a preset period of time for each of said plurality of communication channels, said communication controller comprising:
- free running timer means for generating a sequence of timing signals representative of consecutive binary numbers;
- line microprocessor means coupled to said plurality of communication channels and having means for generating in response to a communication control program instruction one of a plurality of binary count signals indicative of a preset period of time, an action code indicative of a timer operation and a channel number of one of said plurality of communication channels;
- said shared memory means coupled to said line microprocessor means for storing said one of said binary count signals, said action code, and said channel number;
- I/O microprocessor means coupled to said shared memory means and said free running timer means, said I/O microprocessor means including control store means for generating a plurality of microinstructions, said I/O microprocessor means including first means responsive to a first microinstruction and said action code for adding said one of said plurality of binary count signals to a first of said sequence of timing signals for generating resulting timing signals for comparison with a second of said sequence of timing signals, and second means responsive to a second microprogram for storing said channel number, a command code indicative of the action said line microprocessor will take and a reason code indicative of said plurality of timeout conditions in said shared memory means when said second of said sequence of timing signals is indicative of a value equal to or greater than said resulting timing signals;
- said line microprocessor means being responsive to said command code and said reason code to call for a predetermined sequence of operations in accordance with one of said plurality of timeout conditions.

6. The system of claim 5 wherein said shared memory means comprises:
- first mailbox means for storing said one of said plurality of binary count signals, said action code and said channel number; and
- second mailbox means for storing said command code, said reason code and said channel number.

7. The system of claim 6 wherein said free running timer means comprises:
- a free running clock for generating a serial sequence of clock signals;
- counting means responsive to said clock signals for generating said sequence of timing signals;
- decoder means responsive to a predetermined plurality of address signals from said I/O microprocessor means for generating a store signal, said predetermined plurality of address signals being generated by said I/O microprocessor means in response to an instruction from a channel control program; and
- driver means coupled to said counting means and said decoder means and responsive to said store signal for transferring said first and said second of said sequence of timing signals on an I/O data bus.

8. The system of claim 7 wherein said line microprocessor means comprises:
- a line data bus for transferring line data signals;
- a line address bus for transferring line address signals;
- a line random access memory coupled to said line data bus and said line address bus and storing instructions representative of a channel control program;
- a line microprocessor coupled to said line data bus and said line address bus and timing means for generating a first plurality of said line address signals for reading a plurality of said line data signals representative of said instructions stored in said line random access memory for generating said one of said plurality of binary count signals, said line microprocessor further generating a second plurality of said line address signals for transfer on said line address bus;
- said first mailbox means being coupled to said line address bus and said line data bus for storing said one of said plurality of binary count signals received over said line data bus from said line microprocessor at an address location designated by said second plurality of said line address signals received over said line address bus; and
- first interrupt means coupled to said line address bus and responsive to a third plurality of address signals received over said line address bus for generating an interrupt signal.

* * * * *